United States Patent
Herman et al.

(10) Patent No.: US 6,261,524 B1
(45) Date of Patent: Jul. 17, 2001

(54) ADVANCED APPARATUS FOR ABATEMENT OF GASEOUS POLLUTANTS

(75) Inventors: Timothy L. Herman; Jack Ellis, both of Napa; Floris Y. Tsang, Walnut Creek; Daniel O. Clark, Pleasanton; Belynda Flippo, Soquel; David Inori, Napa; Keith Kaarup, San Francisco; Mark Morgenlaender; Aaron Mao, both of Napa, all of CA (US)

(73) Assignee: Advanced Technology Materials, Inc., Danbury, CT (US)

( * ) Notice: Subject to any disclaimer, the term of this patent is extended or adjusted under 35 U.S.C. 154(b) by 0 days.

(21) Appl. No.: 09/295,182

(22) Filed: Apr. 20, 1999

Related U.S. Application Data

(63) Continuation-in-part of application No. 09/228,706, filed on Jan. 12, 1999.

(51) Int. Cl.$^7$ .................. F01N 3/10; F01N 3/22
(52) U.S. Cl. ............ 422/173; 422/174; 422/176; 422/198; 422/199
(58) Field of Search .................. 422/173, 176, 422/198, 202, 174, 199

(56) References Cited

U.S. PATENT DOCUMENTS

| | | | |
|---|---|---|---|
| 3,691,729 | 9/1972 | De Rooy et al. ................ | 55/70 |
| 3,780,675 | 12/1973 | Frye et al. ..................... | 110/8 |
| 3,902,853 | 9/1975 | Marsee et al. ................. | 23/277 |
| 4,420,462 | 12/1983 | Clyde ............................ | 422/201 |
| 4,509,456 | 4/1985 | Kleinert et al. ............... | 118/715 |
| 4,719,088 | 1/1988 | Itoh et al. ..................... | 422/106 |
| 4,981,722 | 1/1991 | Moller et al. .................. | 427/248 |
| 5,011,520 | 4/1991 | Carr et al. ..................... | 55/228 |
| 5,037,624 | 8/1991 | Tom et al. ..................... | 423/210 |
| 5,151,395 | 9/1992 | Tom .............................. | 502/67 |
| 5,156,827 | 10/1992 | Tom et al. ..................... | 423/299 |
| 5,183,646 * | 2/1993 | Anderson ...................... | 422/173 |
| 5,277,026 | 1/1994 | Boll et al. ..................... | 60/288 |
| 5,407,646 | 4/1995 | Smith et al. ................... | 422/168 |
| 5,427,746 | 6/1995 | Pereira et al. ................. | 422/177 |
| 5,518,528 | 5/1996 | Tom et al. ..................... | 95/103 |
| 5,614,156 | 3/1997 | Wang ............................ | 422/174 |
| 5,622,682 | 4/1997 | Tom .............................. | 423/230 |
| 5,643,538 | 7/1997 | Morlec et al. ................. | 422/173 |
| 5,649,985 * | 7/1997 | Imamura ....................... | 422/174 |
| 5,676,712 | 10/1997 | Anderson ..................... | 48/192 |
| 5,759,498 * | 6/1998 | Sheu ............................. | 422/173 |
| 5,832,843 * | 10/1998 | Park .............................. | 422/168 |
| 5,900,217 * | 5/1999 | Hartung et al. ............... | 422/171 |

FOREIGN PATENT DOCUMENTS

| | | |
|---|---|---|
| 0 057 878 A1 | 8/1982 | (EP) . |
| 0 346 893 A1 | 12/1989 | (EP) . |
| 0 347 753 A1 | 12/1989 | (EP) . |
| 694735 * | 1/1996 | (EP) . |
| 1029580 A1 * | 8/2000 | (EP) ................. B01D/53/56 |
| 9-213596 * | 8/1997 | (JP) . |
| WO 90/14184 | 11/1990 | (WO) . |
| WO 94/21968 | 9/1994 | (WO) . |
| WO 95/18674 | 7/1995 | (WO) . |
| WO 96/00076 | 1/1996 | (WO) . |
| WO 96/23173 | 8/1996 | (WO) . |
| WO 97/30275 | 8/1997 | (WO) . |
| 9846334 * | 10/1998 | (WO) . |

* cited by examiner

Primary Examiner—Steven P. Griffin
Assistant Examiner—Maribel Medina
(74) Attorney, Agent, or Firm—Marianne Fuierer; Steven J. Hultquist; Robert A. McLauchlan

(57) ABSTRACT

An apparatus and method are provided for treating pollutants in a gaseous stream. The apparatus comprises tubular inlets for mixing a gas stream with other oxidative and inert gases for mixture within a reaction chamber. The reaction chamber is heated by heating elements and has orifices through which cool or heated air enters into the central reaction chamber. A process is also provided whereby additional gases are added to the gaseous stream preferably within the temperature range of 650 C.–950° C. which minimizes or alleviates the production of NOx.

13 Claims, 4 Drawing Sheets

ADVANCED APPARATUS FOR ABATEMENT OF GASEOUS POLLUTANTS

This is a continuation-in-part of U.S. application Ser. No. 091228,706, filed Jan. 12, 1999, (pending).

The present invention relates to an apparatus and method for the treatment of gas streams containing organic and inorganic pollutants, suitable for applications such as treatment of streams resulting from fabrication of semiconductor materials and devices, micro-electric products, manufacturing of compact discs and other memory devices.

BACKGROUND OF THE INVENTION

The gaseous effluents from the manufacturing of semiconductor materials, devices, products and memory articles involves a wide variety of chemical compounds used and produced in the process facility. They contain inorganic and organic compounds, breakdown products of photo-resist and other reagents, and a wide variety of other gases which must be removed from the waste gas streams before being vented from said facility. Typical to the industry, such effluents, either as a single component or multi-component composition, are mixed with an oxidant, such as high purity oxygen, air, nitrous oxide, or other reagents and thermally reacted and/or oxidized at elevated temperatures in a central reaction chamber.

In semiconductor manufacturing processes, various processing operations can produce combustible gas streams. Hydrogen and a variety of hydrides, VOC's, PFC's, HAP's, etc. may be present and, if combined with air, oxygen or other oxidant species such as nitrous oxide, chlorine, fluorine and the like, form reactive mixtures.

However, the composition of the waste gas generated at a workstation may vary widely over time as the successive process steps are carried out. Additionally there are many different wafer process tools with many different recipe chemistries used in typical semiconductor process facilities.

With this variation of the composition of waste gas streams and the need to adequately treat the waste gas on a continuous basis during the operation of the facility, a common approach taken is to provide a single large-scale waste treatment system for an entire process facility. Such systems are almost always over-designed in terms of its treatment capacity, and typically do not have the ability to safely deal with a large number of mixed chemistry streams without posing complex reactive chemical risks. The operating cost associated with heating an extremely dilute mixed gas stream to appropriate elevated temperatures to achieve abatement performance targets is also an issue, in addition to the huge capital cost associated with large scale oxidation units, which often use catalytic chemistry. Furthermore, one of the problems of great concern in gas effluents is the formation of acid mist, acid vapors, acid gases and NOx (NO, $NO_2$). The present invention provides a method for alleviating the formation of NOx by the appropriate injection of additives into the reactor which not only minimizes or eliminates NOx formation, but also yield less acidic, hence less corrosive effluents.

The present invention provides compact, dedicated units, which may be employed at the point of use. They are designed to serve a single tool, or group of similar chemistry process tools, individual processing operation, or group of abatement compatible process operations to effectively and efficiently remove pollutants without being over-designed with respect to volume capacity, chemical complexity, heat generation and power consumption.

SUMMARY OF THE INVENTION

The present invention provides a process for abating chemical pollutants in a pollutant-containing gas stream by introducing the gas stream into a reactor chamber through a conduit, which accommodates at least one secondary inlet through which is introduced at least one gaseous reagent (with or without additional gaseous, liquid or solid reagents) to cause a controlled reaction in the gas stream by mixing and optionally, by heating. The desired reagent may also be generated in situ (e.g., thermally formed) in the mixing stream. Said reagent(s), added through inlets and/or directly or as precursor(s) into the reactor chamber, may be selected from the group consisting of hydrogen, hydrocarbons, ammonia, air, oxygen, water vapor, alcohol, ethers, calcium compounds, amines, and a mixture of these gases, liquids and/or solids. For example, mixtures such as ammonia/air and ammonia/oxygen have been found to be useful reagents. The reaction of the pollutant containing gas stream with the reagent is within the temperature range of about 650 C. to 950 C.

The present invention provides an apparatus for removing pollutants from gaseous streams. It comprises a pre-reaction injection section, a thermal reactor section and a liquid scrubber section to achieve target abatement performance. In one embodiment, ports are located in the pre-reactor injection section and/or the main thermal reaction chamber for introducing a gas in such a way as to reduce or alleviate particle build-up in the main reactor section.

The thermal reactor is provided with at least one inlet comprising a conduit terminating with a portion of the conduit within the reactor which projects into the reactor into a tube defining an area in which there could be flame formation (hot zone or reaction zone).

The thermal reactor comprises a central chamber accommodating heating elements, a side inlet communicating with an exterior air space between the exterior wall and the heating elements, and an interior air space optionally communicating with the exterior air space. There is also, optionally, a distributor for introducing a gas, liquid and/or solid into the central chamber at a distance from the open end of the tube.

In one embodiment, the distributor is located out of the hot zone. The interior air space is defined by the interior wall and the heating elements, and an orifice means of introducing gas, liquid and/or solid into the central chamber through the interior wall, the inlet section, and/or the central chamber open end. The orifice may be located upstream of a hot zone created at the open end of the conduit and/or located downstream of the hot zone. The gases exiting the thermal reactor are cooled when passed through a liquid cooling section containing a vortex and/or spray chamber.

The cooled gases from the combustion chamber are then passed through a counter-current and/or co-current flow packed bed liquid scrubber for chemical pollutant scrubbing and trapping and condensing particles by flowing the gas stream through the packed bed with or against a flowing liquid. Inlets are provided for introducing gases to the upper portion of the bed to lower the exhaust dew point.

The present invention also, optionally, has a means of sensing gases, liquids and/or solids for the purpose of monitoring and/or controlling the invention at desired and/or optimal operating conditions.

DETAILED DESCRIPTION OF THE PREFERRED EMBODIMENTS

Figure 1:
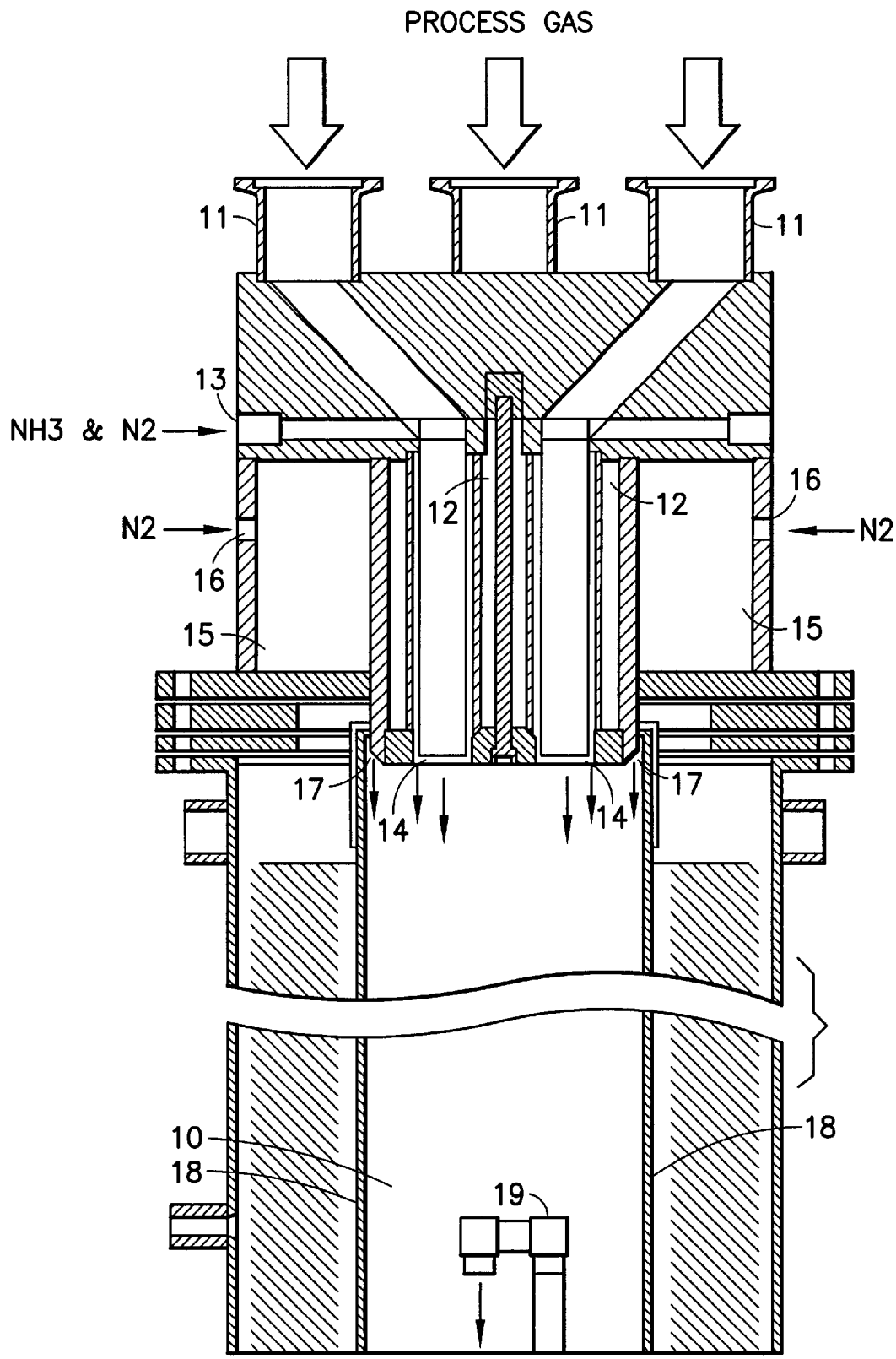
FIG. 1 is a diagram of an intake conduit according to the present invention illustrating a chamber for the introduction of gas along the wall of the chamber and an optional gas distributor.

Referring to FIG. 1, there is shown the entry end of a reaction chamber 10 wherein the process gases are introduced through, optionally, one or more inlets 11 of the pre-reaction chamber section. The lower portion of inlet 11 is surrounded by annular chambers 12 into which reagent gas liquid and/or solid, air or oxygen is introduced through port 13 and which exit into the reaction chamber through outer port 14 at the exit of inlet 11. Another annular chamber 15 is provided for introducing nitrogen or other gas, which enters chamber 15 through port 16 and which exits the circumferential port 17 to flow the gas downwardly along the inside surface of the reactor wall 18 (or other strategical injection point). The flow of the gas along the reactor wall reduces or alleviates the build-up of particulate matter.

In some instances, a hot zone or reaction zone is created at the exit of inlets 11 within the reaction chamber and it may be desirable or necessary to introduce other reagent(s). For this purpose, a gas, liquid and/or solid distributor 19 is optionally provided downstream of the inlets 11 and within or outside of said reaction or hot zone.

A preferred embodiment of the use of apparatus according to the present invention is for abating a chemical pollutant-containing gas stream by a controlled mixing of said gas stream with one or more reagent(s), preceding and/or followed by flowing this mixture through the main reaction chamber maintained under controlled conditions, to effect desirable reaction(s) during this passage. Particularly preferred reagents are hydrogen, hydrocarbons, ammonia, air, oxygen, water vapor, alcohol, ethers, calcium compounds and amines. The alcohols are lower alcohols such as methanol, ethanol, and the like. Ethers are lower ethers such as dimethyl ether, methyl ethyl ether, and the like. The amines are lower amines such as methylamine, dimethyl amine, and the like. A particularly preferred mixture is a combination of ammonia and oxygen or air. This mixture is particularly preferred for streams containing halogens, such as chlorine and/or fluorine. Thus ammonia, ammonia and air, or ammonia and oxygen are added under controlled conditions to the process gas in a mixing zone of the reaction chamber within the temperature range of about 650 C.–950 C. A particular advantage of this process is that the pH of the liquid from the scrubber is raised to approximately 3–10, which creates a much less corrosive environment than the more acidic liquids and vapors typically formed.

Oxygen or other gases, liquids and/or solids may be added downstream of the mixing zone to obtain optimal performance on start-up, the mixture and/or temperature can then be readjusted during the cleaning cycle. As shown in FIG. 1, the downstream introduction of gases may be through a tube 19 for directing gas downstream, or may be another gas distributing device such as a manifold or injector.

Figure 2:
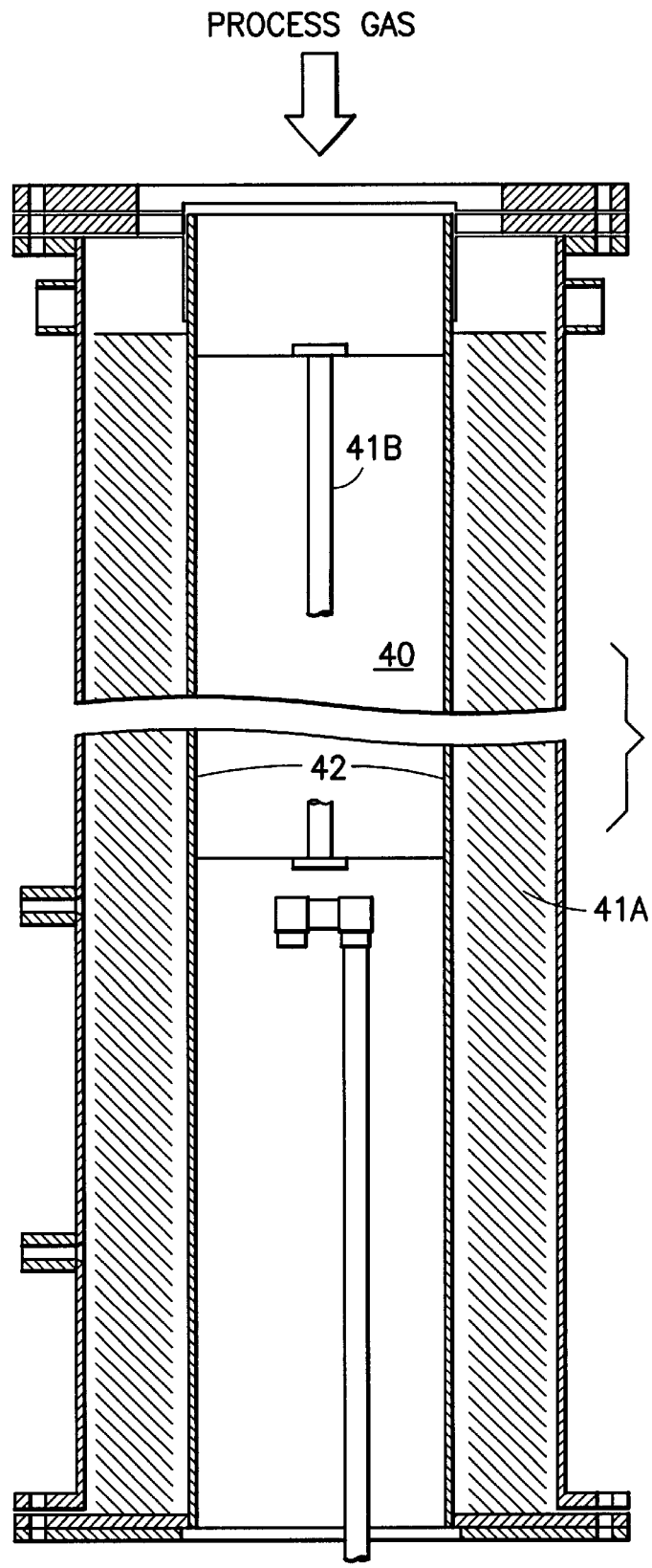
FIG. 2 is a cut-away view of the elevation of a thermal reactor according to the present invention.

Referring to FIG. 2, there is shown a thermal reactor according to the present invention.

Process gas enters through inlets (not shown) at the top of the reactor into the central chamber 40. Heating elements 41a are electrically heated to provide high temperature hot surfaces on the interior wall 42. Heating elements 41a are shown as annularly located surrounding the chamber 40. Optionally, heating elements 41b may also be located within chamber 40. Air (cool or heated) may be introduced into the reactor chamber 40 anywhere at the inlet end and/or exit end of chamber 40 or somewhere in between by ways of single and/or multiple injection points, not shown.

The location of the injection points may be varied according to the desired configuration of the reactor. For example, there is typically a hot zone created at the entry end of the reactor where the process gas and reagents are introduced. Depending upon the optimum chemistry and stoichiometry, the injection points may be located upstream, in or downstream of the hot zone.

Figure 3:
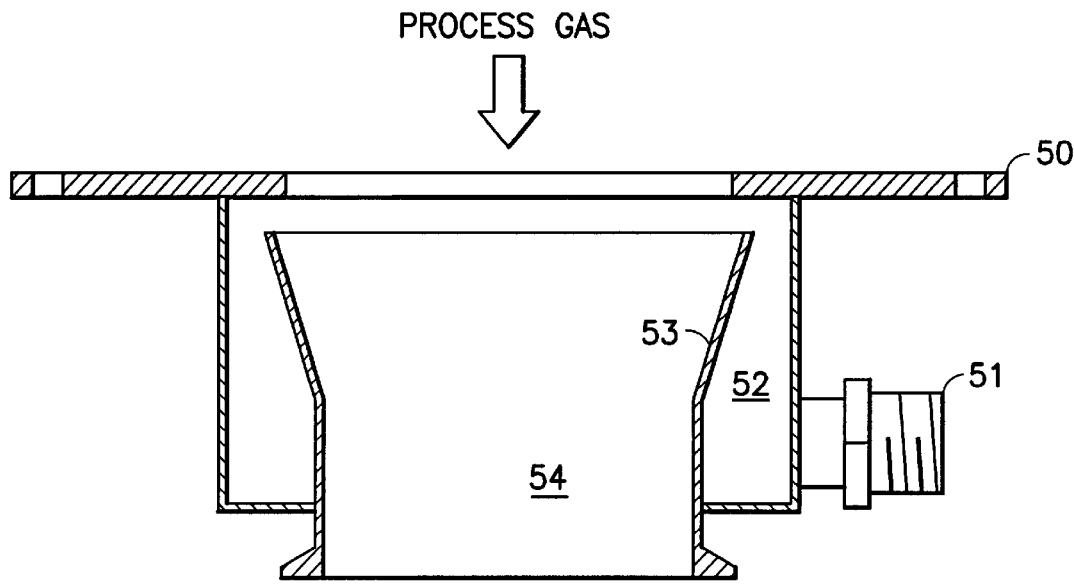
FIG. 3 is a cut away view of a liquid vortex design according to the present invention.

Referring to FIG. 3, there is shown a liquid vortex 50. The gases exit the reactor at the bottom of chamber 40 into a liquid vortex 50, where liquid enters through 51 tangentially into outer chamber 52 to create a swirling motion, causing the liquid to rise and overflow internal wall 53 into the main chamber 54 to control the temperature of the surface and to maintain a continuous liquid film on the wall. This, along with additional liquid sprays, allows contact between the liquid and gases, liquids and/or solids to cool down the gaseous stream to temperatures typically below 100° C. The liquid vortex optionally may have an insert (not shown) extending the reactor chamber 40 to any point into the vortex.

Figure 3A:
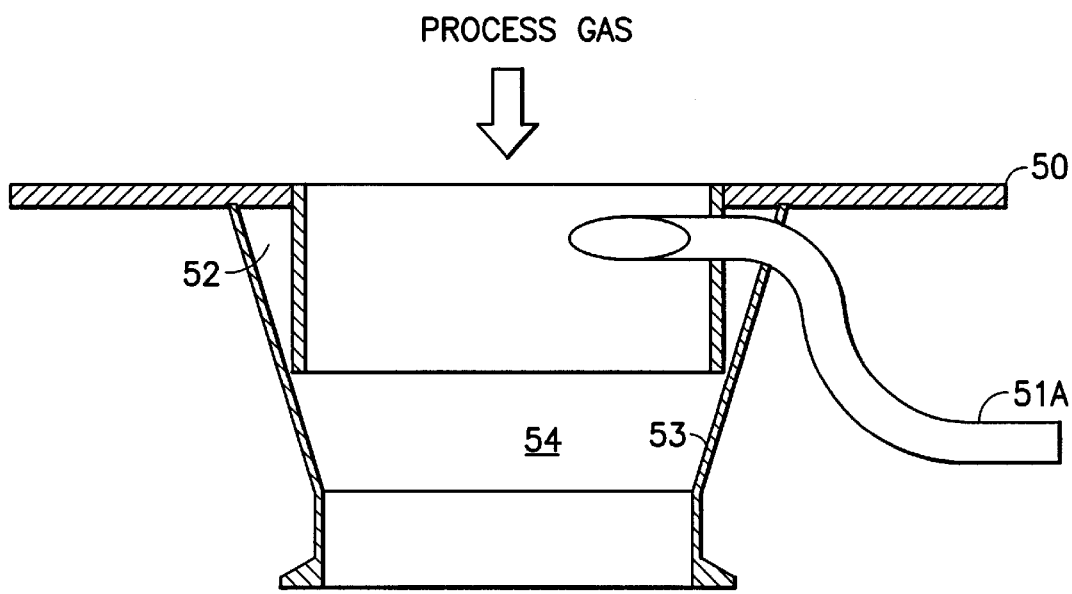
FIG. 3a is a cut away view of another example of a liquid vortex design according to the present invention.

A modification is shown in FIG. 3A where the liquid enters directly into the gas stream through nozzle 51A.

The gases then exit the liquid vortex section cooled to less than 100° C.

Figure 4:
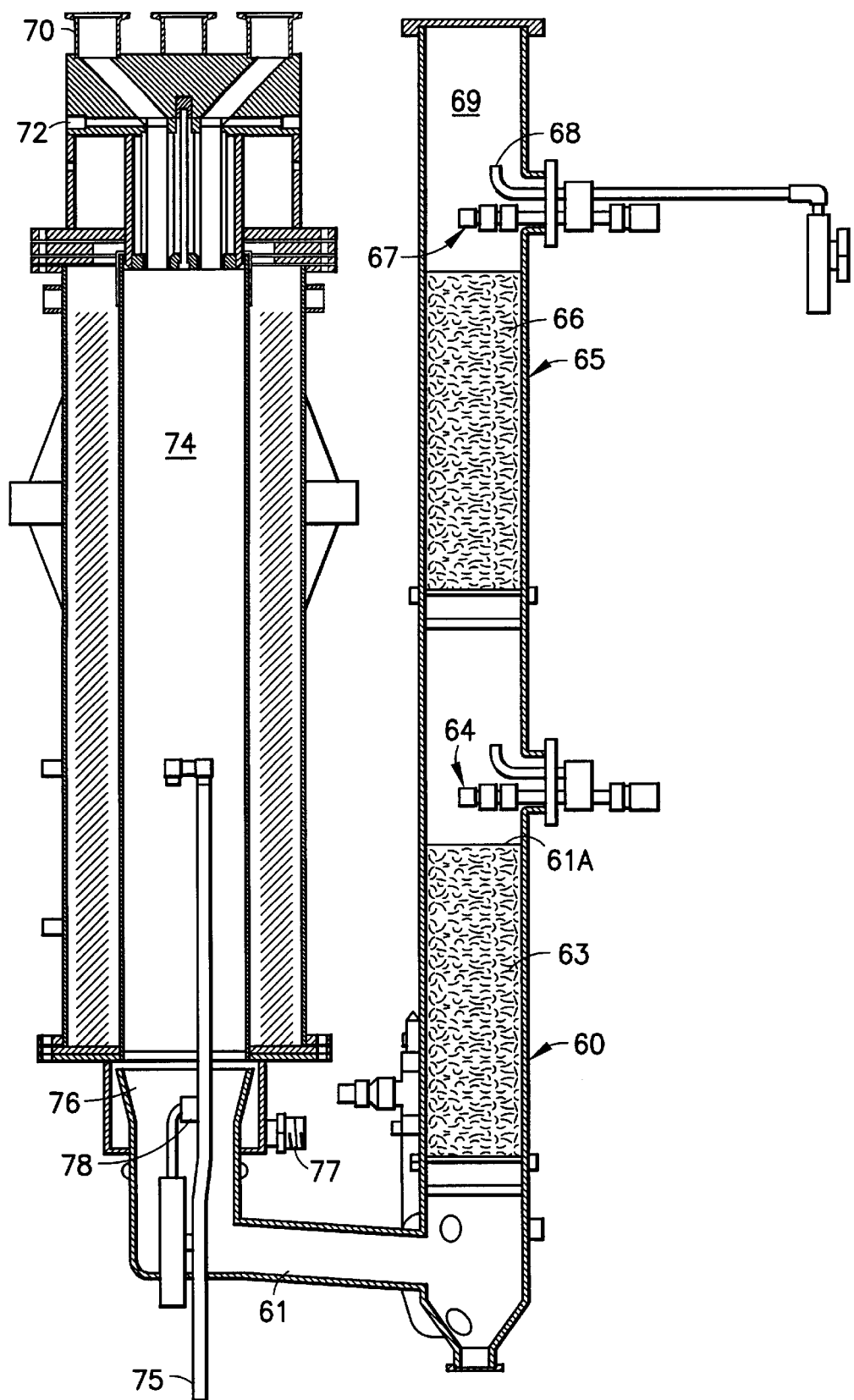
FIG. 4 is a diagram of an apparatus comprising the thermal reactor and packed bed liquid scrubber.

Referring now to FIG. 4, there is shown in diagram form a processing facility using all of the above-described features. The process gas from one or more stations enters the inlets 70, and is mixed, if required, with a reagent gas, liquid and/or solid, oxygen or other gas and with an inert purge gas, such as nitrogen as described in connection with FIG. 1. The capacity of the facility will depend upon the size of hardware components, types of process gases and reagents, etc. Typical gas flow rates through the facility are less than about 300 slm. The gases are then treated in the thermal reactor 74, to which air is optionally introduced through lines 72 and/or 75. The gases exiting the bottom of thermal reactor 74 pass through a vortex 76 of liquid flowing through line 77 (plus optionally a water spray 78) into the packed bed liquid scrubber 60. The gases from the thermal reactor exit through conduit 61 and pass through a water spray and into a packed bed containing packing 63 through which the gases are flowed in counter-current and/or optionally co-current manner through the packing with and/or against the flow of water provided by continuous sprayer 64. Particle-containing liquid flows to the bottom to exit to a sump tank, and/or recirculation tank, and/or direct drain. The gas is typically directed via ports 61A to a demister section 65 where moisture and additional particulate are removed via demister packing 66 and the cleaning of this section is accomplished with liquid provided by a continuous and/or an intermittent sprayer 67. Air is injected through port 68 to provide direct gas cooling and promote reduction of the dew point of the exiting gas. The treated gas then exits through flue 69.

Optional detectors can be located in the invention to monitor target components. Such information is then fed back to control the abatement parameters, such as temperature and feed rate of individual reagents etc.

EXAMPLE 1

In an apparatus as shown in FIG. 4 with inlets as shown in FIG. 1, $F_2$ (fluorine) a by-product present in semiconductor process gases was tested. The abatement achieved (measured as % DRE, decomposition removal efficiency) and NOx formation, based on 20% utilization of the $F_2$, were measured. The optimum gas flow rate (in standard liters/min, slm) and Ammonia gas addition at the reactor inlet are given to achieve the indicated DRE.

| Test # | Gas | Flow, SLM | NH3 flow, SLM | Pump purge, SLM | % DRE | NO out, PPM | NO2 out, PPM |
|---|---|---|---|---|---|---|---|
| 1 | F2 | 1.0 to 4.0 | 3.0 | 50 | 99.9+ | <30 LDL* | <30 LDL |
| 2 | F2 | 1.0 to 2.0 | 1.0 to 3.0 | 100 | 99.9+ | <40 LDL | <40 LDL |

Test 1 — A constant flow of 3.0 SLM of NH3 was used to treat increasing flows of F2 (1.0 to 4.0 SLM). DRE remained above 99.9% for the range of testing. F2 DRE was consistently above 99% for the widest range of flows.
Test 2 — F2 was tested at 1.0 and 2.0 SLM as NH3 was varied from 1.0 to 3.0 SLM. Again, DRE remained above 99.9%.
*LDL is the calculated Lower Detection Limit for the Quadripole Mass Spectrometer at the settings used in the R&D lab. NO and NO2 typically did not register in any of the QMS readouts.

EXAMPLE 2

In a similar device, $Cl_2$ (chlorine) a by-product present in semiconductor process gases was tested. The abatement achieved (measured as % DRE, decomposition removal efficiency) and NOx formation, based on 20% utilization of the Cl2 were measured. The optimum gas flow rate (in standard liters/min, slm) and Ammonia gas (NH3) addition at the reactor inlet are given to achieve the indicated DRE.

| Test # | Gas | Flow, SLM | NH3 flow, SLM | Pump purge, SLM | % DRE | NO out, PPM | NO2 out, PPM |
|---|---|---|---|---|---|---|---|
| 1 | Cl2 | 1.0 | 1.0 to 6.0 | 240 | 96+ | <40 LDL | <40 LDL |
| 2 | Cl2 | 0.25 to 1.5 | 1.5 | 100 | 94+ | <40** | <10 |
| 1 | Cl2 | 1.5 | 3.0 | 100 | 99.0 | <40 | <10 |

Test 1 — Cl2 was held constant at 1.0 SLM as NH3 was varied from 1.0 to 6.0 SLM. The DRE remained above 96% and climbed as high as 99.9% at higher NH3 flows.
Test 2 — NH3 was held constant at 1.5 SLM as Cl2 flow was changed from 0.25 to 1.5 SLM. DRE varied from 99.99% for the 0.25 SLM Cl2 flow to 94% for the 1.50 SLM Cl2 flow.
Test 3 — NH3 was raised from 1.5 to 3.0 SLM with the Cl2 fixed at 1.5 SLM. This test was performed to compare DRE as a function of mole ratio of NH3 to Cl2. The higher flows had a greater DRE than the lower flows at the same mole ratio.
**Data taken with FTIR. LDL near 1 PPM.

EXAMPLE 3—NF3

In a similar device to that described in example 1, nitrogen trifluoride (NF3) was tested for abatement efficiency and nitric oxide and/or nitrogen dioxide (NOx) formation. Abatement efficiencies $\geq 99.999\%$ were achieved for all influent NF3 flows tested (0.125–0.5 standard liters per minute (slm)) with a minimum hydrogen inlet concentration* of 10%. At hydrogen inlet concentrations $\geq 18\%$, NOx formation was suppressed to below the analytical instrumentation's detection limit.
*Inlet concentration refers to the ratio of hydrogen in slm to the total flow of gases entering the device through the individual inlet

EXAMPLE 4—NOx

In another similar device, testing was performed to determine the capability of the system for NOx abatement. 100 standard cubic centimeters per minute (sccm) of NOx was injected into the abatement device inlet. Test variables included thermal reactor set-points of 700 C. and 850 C. and hydrogen inlet concentrations between 5 and 18 slm. Abatement efficiencies of >70 and >85% were achieved at 700 C. and 850 C., respectively, with a hydrogen inlet concentration of 18%.

EXAMPLE 5

In a device similar to that described in Example 1, using argon as a process gas flowed at 35 slm at temperatures varying from about 700 C. to 840 C., oxygen and/or ammonia were added to the flow stream. Oxygen was added using 5 or 8 slm. Ammonia was added at increments between 0.25–6.0 slm. The temperature at the point which the gases are mixed was held constant at 850 C. The product stream was analyzed by mass spectrometry, particularly for oxygen, nitrogen, NOx and ammonia. It was found that when using a combination of oxygen and ammonia, as ammonia was increased, holding oxygen constant, initially NOx formation increased with ammonia concentration. Beyond a threshold, the NOx concentration decreased. This indicates an operating condition where optimal ammonia and oxygen flow rates where the chemistry and stoichiometry favor a reduction of NOx.

The invention having been fully described, further modifications of the invention will become apparent to those of ordinary skill in the art. Such modifications are within the scope of the invention, which is defined by the claims set forth below.

What is claimed is:

1. A thermal reactor system, comprising:
   a pre-reaction injection section and an immediately adjacent thermo reaction section,
   the thermo reaction section comprising a central reaction chamber having an interior wall, and electrical heating elements annularly located around said interior wall to provide hot surfaces on the interior wall;
   an entry end immediately adjacent to the pre-reaction injection section and an exit end of said central reaction chamber; and
   a hot zone within said central reaction chamber located adjacent to said entry end wherein gases entering said central reaction chamber at the said entry end additionally react and mix; and a circumferential port positioned about the central reaction chamber for flowing gas along the inside surface of the central reaction chamber to reduce or alleviate build-up of particulate matter on the reaction chamber wall, said circumferential port located upstream of said hot zone.

2. The apparatus according to claim 1, wherein said heating elements are annularly located around said chamber in said interior wall.

3. The apparatus according to claim 1, wherein said heating elements are annularly located around said chamber on said interior wall.

4. A thermal reactor system, comprising:

a pre-reaction injection section and an adjacent thermal reaction section, the thermal reaction section comprising a central reaction chamber having electrical heating elements annularly located around an interior wall of said central reaction chamber to provide hot surfaces thereon;

an entry end immediately adjacent to the pre-reaction injection section and an exit end of said central reaction chamber; and a hot zone within said central reaction chamber located adjacent to said entry end wherein gases entering said central reaction chamber react and mix; and an orifice in said central reaction chamber for introducing air into said central reaction chamber; said orifice located downstream of said hot zone.

5. An apparatus according to claim 4, wherein said heating elements are annularly located around said chamber in said interior wall.

6. An apparatus according to claim 4, wherein said heating elements are annularly located around said chamber on said interior wall.

7. An apparatus for treatment of gaseous pollutants in a gas stream, said apparatus comprising a pre-reaction injection section and an immediately adjacent thermnal reactor section;

the thermal reaction section comprising a central reaction chamber having an interior wall, and electrical heating elements annularly located around said interior wall to provide hot surfaces thereon;

an entry end and an exit end of said central reaction chamber, said entry end for introducing a gaseous mixture of at least gaseous pollutants and a reagent gas, said exit end for a gas stream of at least reaction products, an orifice for introducing air into said central reaction chamber between said entry and exit end of said central reaction chamber;

the pre-reaction injection section comprising at least one inlet for conducting said gaseous mixture of gaseous pollutants and reagent gas stream into said entry end of said central reaction chamber, said inlet comprising a conduit terminating with a portion of said conduit within said central reaction chamber wherein said portion of said conduit is located within a tube which projects beyond the end of said conduit to define a chamber with said tube, said tube having an open end communicating with the interior of said central reaction chamber;

ports located at the entry end of said central reaction chamber for introducing a reagent into said central reaction chamber directed along the walls of said central reaction chamber to alleviate particle build up;

said conduit further accommodating a secondary inlet for introducing the reagent gas into said conduit to cause premixing of gaseous pollutants and reagent gas before entry into the central reaction chamber; and a gas distributor for introducing a gas, liquid or solid into said central reaction chamber down-stream from said open end of said tube.

8. An apparatus according to claim 7, wherein said gas distributor comprises a manifold.

9. An apparatus according to claim 7, wherein said gas distributor comprises an injection.

10. An apparatus according to claim 7, wherein said gas distributor is located out of a hot zone created near the open end of said tube.

11. An apparatus according to claim 7, wherein said heating elements are annularly located around said chamber in said interior wall.

12. An apparatus according to claim 7, wherein said heating elements are annularly located around said chamber on said interior wall.

13. An apparatus according to claim 7, further comprising a liquid scrubber section positioned further downstream from the pre-reaction injection and central reaction chamber to provide for scrubbing only after thermal reacting of the gas mixture, the liquid scrubber comprising an annular chamber located at the exit end of said central reaction chamber, said annular chamber having an open upper or lower end wherein liquid is forcibly introduced into said annular chamber to form a vortex which flows from said open upper end into said gas stream of at least reaction products exiting said central reaction chamber;

a packed bed liquid scrubber for removing chemical pollutants in said exiting gas stream, wherein said exiting gas stream is downwardly flowed through said bed with downwardly flowing liquid;

a demister section wherein moisture and additional particulate in said gas stream are removed from said gas stream where in said gas stream is flowed through said dry demister;

and where periodically or continuously liquid is sprayed over said demister section to wash the trapped particulate out of said demister material;

and gas inlets for flowing gas into the upper portion of said demister section to further reduce the gas stream temperature and the dew point to reduce condensation;

optional sensors for monitoring and controlling the selective addition of reagents and allow the control of operating conditions to achieve desired abatement efficiency of the abatement invention.

* * * * *